(12) United States Patent
Liao et al.

(10) Patent No.: US 7,150,339 B2
(45) Date of Patent: Dec. 19, 2006

(54) ELECTRICALLY POWERED BICYCLE

(75) Inventors: Hsueh-Chin Liao, Shenzhen (CN); T'sui Hsiao Hung, Shenzhen (CN)

(73) Assignee: HL Corporation, Shenzhen (CN)

( * ) Notice: Subject to any disclaimer, the term of this patent is extended or adjusted under 35 U.S.C. 154(b) by 0 days.

(21) Appl. No.: 10/777,969

(22) Filed: Feb. 12, 2004

(65) Prior Publication Data

US 2004/0163870 A1 Aug. 26, 2004

(30) Foreign Application Priority Data

Feb. 13, 2003 (CN) .............................. 03219888.4

(51) Int. Cl.
- B62M 13/00 (2006.01)
- B62M 11/00 (2006.01)
- B60K 1/00 (2006.01)
- B62J 39/00 (2006.01)

(52) U.S. Cl. .................... 180/221; 180/220; 180/65.6; 280/288.4

(58) Field of Classification Search ................ 180/219, 180/220, 221, 225, 65.6, 65.5, 206, 230; 280/296.75, 291, 278, 287, 288.4; 318/139, 318/461, 799; 388/907, 917
See application file for complete search history.

(56) References Cited

U.S. PATENT DOCUMENTS

| | | | | |
|---|---|---|---|---|
| 1,259,989 A | * | 3/1918 | Hult | 74/396 |
| 1,409,454 A | * | 3/1922 | Kolaczkowski | 280/214 |
| 4,195,705 A | * | 4/1980 | Resele | 180/205 |
| 4,410,060 A | * | 10/1983 | Cunard | 180/205 |
| 5,226,501 A | * | 7/1993 | Takata | 180/206 |
| 5,242,335 A | * | 9/1993 | Kutter | 475/4 |
| 5,316,101 A | * | 5/1994 | Gannon | 180/221 |
| 5,350,982 A | * | 9/1994 | Seib | 318/139 |
| 5,398,955 A | * | 3/1995 | Yeh | 280/287 |
| 5,433,284 A | * | 7/1995 | Chou | 180/205 |
| 5,491,390 A | * | 2/1996 | McGreen | 318/5 |
| 5,528,721 A | * | 6/1996 | Searcy et al. | 388/824 |
| 5,602,448 A | * | 2/1997 | Yaguchi | 318/139 |
| 5,865,267 A | * | 2/1999 | Mayer et al. | 180/205 |
| 5,934,401 A | * | 8/1999 | Mayer et al. | 180/220 |
| 5,975,551 A | * | 11/1999 | Montague et al. | 280/287 |
| 6,011,366 A | * | 1/2000 | Murakami et al. | 318/1 |

(Continued)

FOREIGN PATENT DOCUMENTS

DE 10127769 A1 * 12/2002

(Continued)

Primary Examiner—Lesley D. Morris
Assistant Examiner—Daniel Yeagley
(74) Attorney, Agent, or Firm—Eric Karich

(57) ABSTRACT

An electrically powered bicycle is disclosed including a rear fork assembly having a pair of structures extending from a frame, a wheel attached between the structures of the rear fork assembly, an electric motor mounted adjacent to the wheel, and a drive mechanism disposed between the electric motor and the wheel. The drive mechanism includes a first gear connected to a shaft of the electric motor and a second gear connected to the wheel. The first gear has a first set of teeth meshed with a second set of teeth of the second gear such that when the shaft of the electric motor turns, the second gear provides a rotating force to the wheel.

1 Claim, 2 Drawing Sheets

U.S. PATENT DOCUMENTS

| | | | |
|---|---|---|---|
| 6,024,186 A * | 2/2000 | Suga | 180/291 |
| 6,039,137 A * | 3/2000 | Schless | 180/220 |
| 6,296,072 B1 * | 10/2001 | Turner | 180/220 |
| 6,531,838 B1 * | 3/2003 | Parks | 318/139 |
| 2002/0014366 A1 * | 2/2002 | Turner | 180/220 |
| 2003/0000754 A1 * | 1/2003 | Daudt | 180/220 |
| 2003/0010551 A1 * | 1/2003 | Shirazawa | 180/65.6 |
| 2003/0141696 A1 * | 7/2003 | Chao | 280/287 |

FOREIGN PATENT DOCUMENTS

| | | | |
|---|---|---|---|
| FR | WO 94/25333 | * | 11/1994 |
| JP | 2000025676 A | * | 1/2000 |
| JP | 2000135998 A | * | 5/2000 |

* cited by examiner

ELECTRICALLY POWERED BICYCLE

BACKGROUND OF THE INVENTION

1. Field of the Invention

This invention relates generally to two-wheeled vehicles, and more particularly to electrically-powered bicycles.

2. Description of Related Art

A typical bicycle has two wheels and a pair of rotatable pedals, and is propelled by a rider via the pedals. Due to the levels of physical exertion required, such bicycles are typically used to travel only short distances. Known electrically powered bicycles (i.e., electric bicycles) are bulky, heavy, and mechanically complex. Due to their bulk and weight, known electric bicycles cannot be easily transported on public transportation vehicles such as buses, trains, and airplanes. In addition, known electric bicycles have limited ranges of travel before their batteries need charged.

It would be beneficial to have an electric bicycle that is relatively simple, is small and light enough in weight to be highly portable, and has a useful range of travel between required battery charges.

SUMMARY OF THE INVENTION

An electrically powered bicycle is disclosed including a rear fork assembly having a pair of structures extending from a frame, a wheel attached between the structures of the rear fork assembly, an electric motor mounted adjacent to the wheel, and a drive mechanism disposed between the electric motor and the wheel. The drive mechanism includes a first gear connected to a shaft of the electric motor and a second gear connected to the wheel. The first gear has a first set of teeth meshed with a second set of teeth of the second gear such that when the shaft of the electric motor turns, the second gear provides a rotating force to the wheel.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
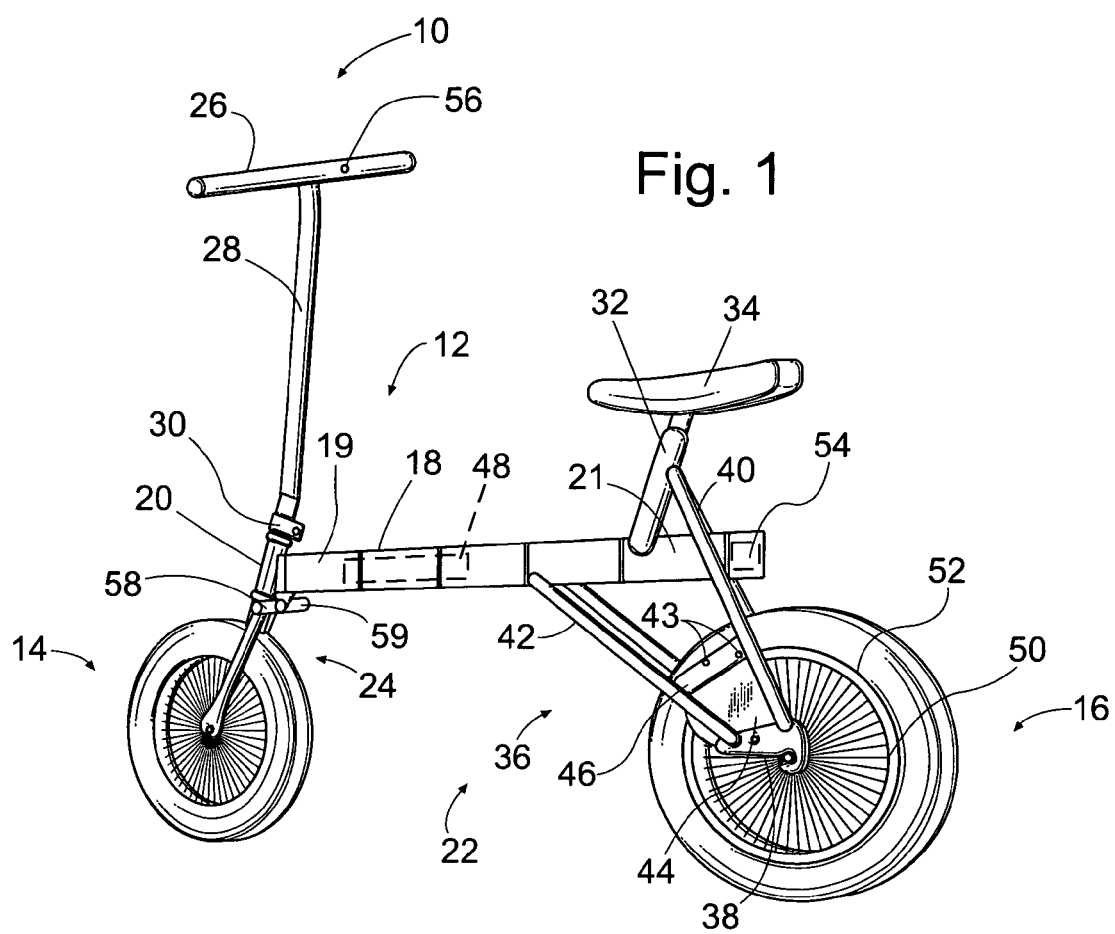
FIG. 1 is a perspective view of one embodiment of an electrically powered bicycle (i.e., electric bicycle) including an electric motor coupled to a control unit.

FIG. 1 is a perspective view of one embodiment of an electrically powered bicycle (i.e., electric bicycle) 10 including a front wheel 14 and a rear wheel 16 attached to a frame 12. The frame 12 includes a front portion 19 and a rear portion 21. The frame 12 may include a main frame tube 18, a head tube 20 attached to the front portion 19 of the main frame tube 18, and a rear fork assembly 22 attached to the rear portion 21 of the main frame tube 18. The rear wheel 16 is connected to the frame 12 via the rear fork assembly 22. A front fork assembly 24 is rotatably mounted in the head tube 20, and the front wheel 14 is connected to the frame 12 via the front fork assembly 24.

A handlebar 26 is connected to a handlebar tube 28. The handlebar tube 28 is advantageously removably connected to an upper portion of the front fork assembly 24 via a quick release clamp 30. The quick release clamp 30 may include, for example, a cam structure that tightens the quick release clamp 30 when rotated in one direction, and loosens (i.e., releases) the quick release clamp 30 when rotated in an opposite direction. When the quick release clamp 30 is tightened, the handlebar tube 28 is substantially rigidly connected to the upper portion of the front fork assembly 24. The handlebar tube 28 (and the connected handlebar 26) may be disconnected (i.e., detached) from the upper portion of the front fork assembly 24 by releasing the quick release clamp 30. Once released, the handlebar tube 28 (and the connected handlebar 26) may be removed from the electric bicycle 10 (e.g., for storage or transport).

The frame 12 may also include a seat tube 32 extending from an upper surface of the rear portion of the main frame tube 18. A seat 34 is mounted on an upper end of the seat tube 32. Although not illustrated in detail, the seat 34 may also be removably mounted in the sear tube 32 using a quick release clamp or similar structure, as described above.

The rear fork assembly 22 includes a pair of "V"-shaped structures extending from opposite sides of a rear portion of the frame 12. The "V"-shaped structures include a left side structure 36 attached to a left side of the frame 12 and a similar right side structure attached to a right side of the frame 12. As shown in FIG. 1, the left side structure 36 includes a left rear wheel mounting bracket 38, a first tube 40, and a second tube 42. The first tube 40 extends from the seat tube 32 to the left rear wheel mounting bracket 38. In the embodiment of FIG. 1, the first tube 40 is attached to the left side of the rear portion of the main frame tube 18. The second tube 42 extends from the left side of a central portion of the main frame tube 18 to the left rear wheel mounting bracket 38. The similar right side structure includes a right rear wheel mounting bracket, a first tube extending from the seat tube 32 to the right rear wheel mounting bracket, and a second tube extending from the right side of the central portion of the main frame tube 18 to the right rear wheel mounting bracket. The rear tire 16 is mounted between the left rear wheel mounting bracket 38 and the right rear wheel mounting bracket.

The electric bicycle 10 is propelled by an electric motor 44 and a drive mechanism disposed between the electric motor 44 and the rear wheel 16. In the embodiment of FIG. 1, the left side structure 36 of the rear fork assembly 22 includes a motor mount bracket 46 extending between the first tube 40 and the second tube 44 above the left rear wheel mounting bracket 38. The electric motor 44 is mounted to an inner surface of the left side structure 36 of the rear fork assembly 22, and is located between the inner surface of the left side structure 36 and the rear wheel 16. Multiple mounting bolts 43 are used to mount the electric motor 44 to the motor mount bracket 46 and to the left rear wheel mounting bracket 38.

In the embodiment of FIG. 1, the electric motor 44 is a direct current (DC) electric motor powered by a battery 48 located the main frame tube 18 as shown in FIG. 1. In a preferred embodiment, the battery 48 includes multiple lithium battery cells connected in series. Positioned within the main frame tube 18, the battery 48 is advantageously protected from the elements.

In one embodiment, the electric motor 44 is a light weight, wire wound, permanent magnet DC motor with a disc-shaped rotor. Suitable electric motors are well known in the industry and are commercially available. One suitable electric motor 44 advantageously includes multiple permanent magnets cut (i.e., sliced) from a larger magnet ingot having a wedge-shaped cross section. Such mass production of the permanent magnets reduces the costs of the magnets.

The drive mechanism includes a pinion gear (i.e., pinion, described below) installed on a shaft of the electric motor 44 and larger gear 50 connected to an inner annular surface of a wheel rim 52 of the rear wheel 16. The pinion has a set of teeth meshed with a set of teeth of the larger gear 50 such that when the shaft of the electric motor 44 turns, the larger gear 50 turns the rear wheel 16.

A control unit 54, described in more detail below, controls the electric motor 44, and is electrically connected to the electric motor 44, a momentary pushbutton switch 56 mounted on the handlebar 26, and the battery 48. The momentary pushbutton switch 56 includes electrical contacts that are normally open, and are closed when the momentary pushbutton switch 56 is pressed. Like the battery 48, the control unit 54 is located in the main frame tube 18 where it is advantageously protected from the elements.

A foot rest tube 58 is connected to an underside surface of the front portion 19 of the frame 12. Ends 59 of the foot rest tube 58 extend outwardly from the right and left sides of the front portion 19 of the main frame tube 18. An operator of the electric bicycle 10 sits on the seat 34 and rests his or her feet on the ends 59 of the foot rest tube 58 when the electric bicycle 10 is in motion.

It is noted that the electric motor 44 (or another electric motor) may be mounted to an inner surface of the right side structure of the rear fork assembly 22, and thereby located between an inner surface of the right side structure of the rear fork assembly 22 and the rear wheel 16.

The electric bicycle 10 of FIG. 1 is relatively simple, and is small and light enough in weight to be highly portable. The easily removable handlebar tube 28 further facilitates transport. The efficient electric motor 44, the low-loss meshed gear drive mechanism, and the high energy storage capacity of the lithium battery 48 result in a highly useful range of travel between required battery charges.

Figure 2:
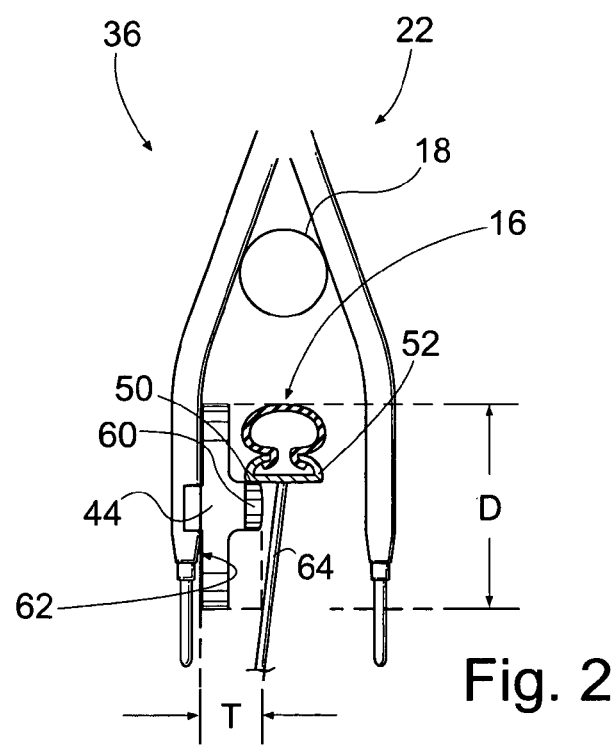
FIG. 2 is a rear elevation view of the electric bicycle of FIG. 1.

FIG. 2 is a rear elevational, partially sectional, view of the electric bicycle 10 of FIG. 1. As shown in FIG. 2 and described above, the drive mechanism includes a pinion 60 installed on the shaft of the electric motor 44 and the larger gear 50 connected to the inner annular surface of the wheel rim 52 of the rear wheel 16. The pinion 60 has a set of teeth meshed with a set of teeth of the larger gear 50 such that when the shaft of the electric motor 44 turns, the larger gear 50 turns the rear wheel 16.

It is noted that other ways of connecting the larger gear 50 to the rear wheel 16 are possible and contemplated. For example, in other embodiments the larger gear 50 may be connected to spokes 64 of the rear wheel 16 that connect the wheel rim 52 of the rear wheel 16 to a hub. Such alternative placements of the larger gear 50 should be considered within the scope of the claimed invention.

As shown in FIG. 2, the electric motor 44 advantageously has a diameter "D" that is greater than a thickness "T" such that the electric motor 44 can be mounted between an inner surface 62 of the side structure 36 of the rear fork assembly 22 and the spokes 64.

Figure 3:
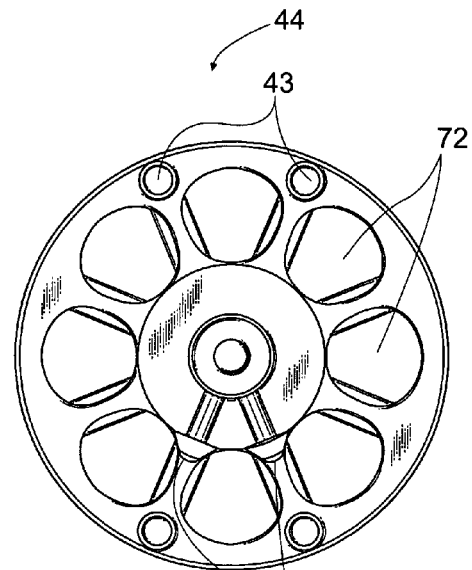
FIG. 3 is a side elevation view of the electric motor of FIGS. 1–2.

FIG. 3 is a side elevation view of the electric motor 44 of FIGS. 1–2. In this embodiment, the electric motor 44 includes multiple permanent magnets 72, and multiple mounting bolts 43 used to mount the electric motor 44 to the motor mount bracket 46 and to the left rear wheel mounting bracket 38. The detailed construction of such as electric motor 44 is known in the art, and is therefore not described in greater detail herein.

Figure 4:
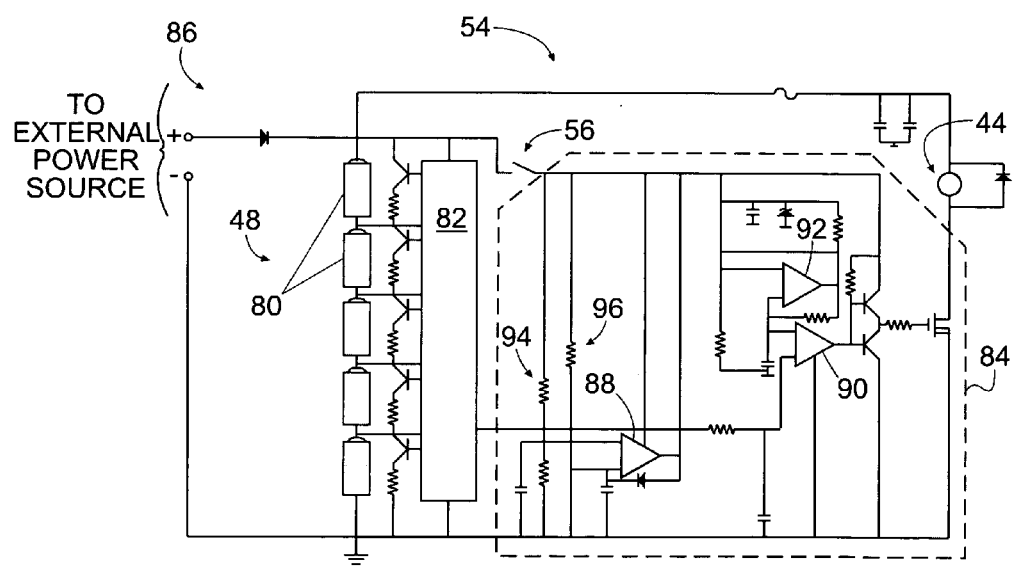
FIG. 4 is a circuit diagram of one embodiment of the control unit of FIG. 1.

FIG. 4 is a circuit diagram of one embodiment of the control unit 54 of FIG. 1. In general, the control unit 54 is electrically connected to the electric motor 44 of FIGS. 1–3, the momentary pushbutton switch 56 of FIG. 1, and the battery 48 of FIG. 1. In FIG. 4 the electric motor 44 and the momentary pushbutton switch 56 are represented, as are multiple battery cells 80 of the battery 48 of FIG. 1. As described above, the multiple battery cells 80 are preferably lithium battery cells.

In the embodiment of FIG. 4, the control unit 54 includes a battery management module 82 and motor speed control portion 84. A connection 86 to an external power source is provided for charging the battery cells 80 of the battery 48. The battery management module 82 controls a flow of electrical current into and out of each of the battery cells 80.

The motor speed control portion 84 implements 2-speed control of the electric motor 44 via pulse width modulation. In general, the motor speed control portion 84 provides electrical power from the battery 48 to the electric motor 44 dependent upon a number of times the momentary pushbutton switch 56 is pressed and released within a predetermined period of time. When the momentary pushbutton switch 56 is pressed and released a first time, the predetermined period of time begins. If the momentary pushbutton switch 56 is not pressed and released again during the predetermined period of time, the motor speed control portion 84 turns the electric motor 44 on and off rapidly such that a period of time the electric motor 44 is on is substantially equal to a subsequent period of time that electric motor 44 is off. In this situation, the electric motor 44 has a duty cycle of about 50 percent.

The rate at which that the motor speed control portion 84 turns the electric motor 44 on and off is typically selected dependent upon the electrical and mechanical characteristics of the selected electric motor 44 and other factors. Generally, the motor speed control portion 84 may turn the electric motor 44 on and off between about 100 times per second and approximately 40,000 times per second. Switching rates exceeding 20,000 times per second are often preferred as the electric motor 44 does not produce an audible hum or whine.

When the momentary pushbutton switch 56 is pressed and released once, then pressed and released again during the predetermined period of time, the motor speed control portion 84 turns the electric motor 44 on continuously such that the electric motor 44 has a duty cycle of 100 percent.

In FIG. 4, the motor speed control portion 84 of the control unit 54 includes 3 comparators 88, 90, and 92 and two resistor-capacitor (RC) networks 94 and 96. The comparator 88 receives signals from the momentary pushbutton switch 56 via the RC networks 94 and 96 and provides electrical power to the comparator 92 dependent upon the signals. The comparator 92 is part of a triangle wave generator circuit enabled by output signal of the comparator 88. The comparator 90 drives switching devices that connect the electric motor 44 to the battery 48.

Each of the comparators 88, 90, and 92 have two input terminals and an output terminal. The RC network 94 includes a capacitor C1 connected between a first input terminal of the comparator 88 and a ground (reference) potential. The RC network 96 includes a capacitor C2 connected between the second input terminal of the comparator 88 and the ground potential. A diode D1 is connected between the output terminal of the comparator 88 and the second input terminal of the comparator 88. When pressed, the momentary pushbutton switch 56 applies electrical power from the battery 48 to the RC networks 94 and 96 simultaneously.

As described above, the predetermined period of time begins when the momentary pushbutton switch 56 is pressed and released. The values of resistors and capacitors making up the RC networks 94 and 96 determine the predetermined period of time. In general, the RC network 96 has a time constant that is larger than a time constant of the RC network 94. When the momentary pushbutton switch 56 is pressed once and released, and is not pressed and released again during the predetermined period of time, the comparator 88 produces an output signal that enables the triangle wave generator circuit including the comparator 92. The comparator 90 receives the triangle wave signal and uses the triangle wave signal to drive the switching devices such that the electric motor 44 is turned on and off rapidly. As described above, the period of time the electric motor 44 is on is substantially equal to the subsequent period of time that electric motor 44 is off, and the electric motor 44 has a duty cycle of about 50 percent.

When the momentary pushbutton switch 56 is pressed once and released, then pressed and released again during the predetermined period of time, the comparator 88 produces an output signal that disables the triangle wave generator circuit including the comparator 92. In the absence of the triangle wave signal from the generator circuit including the comparator 92, the comparator 90 drives the switching devices such that the electric motor 44 is on continuously. As described above, in this situation the electric motor 44 has a duty cycle of 100 percent.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An electrically powered bicycle, comprising:
   a rear fork assembly including a pair of structures extending from a frame;
   a wheel attached between the structures of the rear fork assembly, the wheel having a rim and spokes;
   an electric motor mounted adjacent to the wheel;
   a drive mechanism disposed between the electric motor and the wheel, wherein the drive mechanism comprises:
      a first gear connected to a shaft of the electric motor and comprising a first plurality of teeth;
      a second gear connected to the rim of the wheel and comprising a second plurality of teeth; and
      wherein the teeth of the first gear are meshed with the teeth of the second gear such that when the shaft of the electric motor turns, the second gear provides a rotating force to the wheel;
   a momentary pushbutton switch;
   a battery;
   a control unit electrically connected to the electric motor, to the battery, and to the momentary pushbutton switch, and configured to provide electrical power from the battery to the electric motor dependent upon a number of times the momentary pushbutton switch is pressed and released within a predetermined period of time;
   wherein the predetermined period of time begins when the momentary pushbutton switch is pressed and released a first time;
   wherein when the momentary pushbutton switch is pressed and released the first time, and is not pressed and released again during the predetermined period of time, the control unit provides electrical power from the battery to the electric motor such that the electric motor is turned on and off rapidly;
   wherein the control unit provides electrical power from the battery to the electric motor such that the electric motor is turned on for a first period of time and subsequently off for a second period of time, and wherein the first and second periods of time are substantially equal; and
   wherein when the momentary pushbutton switch is pressed and released the first time, then pressed and released again during the predetermined period of time, the control unit provides electrical power from the battery to the electric motor such that the electric motor is on continuously.

* * * * *